US009501114B2

United States Patent
Son et al.

(10) Patent No.: US 9,501,114 B2
(45) Date of Patent: Nov. 22, 2016

(54) APPARATUS AND METHOD FOR MANAGING POWER BASED ON DATA

(71) Applicant: SAMSUNG ELECTRONICS CO., LTD., Suwon-si (KR)

(72) Inventors: Min Young Son, Hwaseong-si (KR); Young Sam Shin, Hwaseong-si (KR); Chae Seok Im, Suwon-si (KR); Seung Won Lee, Hwaseong-si (KR); Shi Hwa Lee, Seoul (KR); Jae Don Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 13/903,256

(22) Filed: May 28, 2013

(65) Prior Publication Data

US 2014/0019782 A1    Jan. 16, 2014

(30) Foreign Application Priority Data

Jul. 16, 2012 (KR) ........................ 10-2012-0077221

(51) Int. Cl.
*G06F 1/26* (2006.01)
*G06F 1/32* (2006.01)
*G06F 9/45* (2006.01)

(52) U.S. Cl.
CPC .............. *G06F 1/26* (2013.01); *G06F 1/3203* (2013.01); *G06F 1/3234* (2013.01); *G06F 8/4432* (2013.01); *Y02B 60/181* (2013.01)

(58) Field of Classification Search
CPC ................................... G06F 8/4432
See application file for complete search history.

(56) References Cited

U.S. PATENT DOCUMENTS

| 6,990,594 | B2 | 1/2006 | Kim |
| 7,224,756 | B2 | 5/2007 | Subramoniam et al. |
| 7,392,099 | B2 | 6/2008 | Atkinson et al. |
| 8,055,828 | B2 | 11/2011 | Conti et al. |
| 2003/0014742 | A1* | 1/2003 | Seth et al. ................... 717/158 |
| 2003/0126476 | A1 | 7/2003 | Greene |
| 2003/0182589 | A1 | 9/2003 | Tani |
| 2007/0300214 | A1 | 12/2007 | Chang et al. |

(Continued)

FOREIGN PATENT DOCUMENTS

| JP | 61-156459 | 7/1986 |
| JP | 2004-199139 | 7/2004 |

(Continued)

OTHER PUBLICATIONS

Extended European Search Report issued on Oct. 30, 2014, in counterpart European Application No. 13176648.7 (12 pages, in English).

(Continued)

*Primary Examiner* — Kim Huynh
*Assistant Examiner* — Joshua Neveln
(74) *Attorney, Agent, or Firm* — NSIP Law

(57) ABSTRACT

Provided is an apparatus and method for managing power based on data. The apparatus may include a code segment searching unit configured to search for at least one code segment in which a power type is inserted, a block determining unit configured to determine at least one block based on the at least one found code segment, and a power mode control unit configured to control the at least one determined block to operate in a power mode corresponding to the power type.

20 Claims, 12 Drawing Sheets

(56) References Cited

U.S. PATENT DOCUMENTS

| | | |
|---|---|---|
| 2011/0093726 A1 | 4/2011 | Worthington et al. |
| 2011/0264938 A1 | 10/2011 | Henroid et al. |

FOREIGN PATENT DOCUMENTS

| | | |
|---|---|---|
| JP | 2004-326153 | 11/2004 |
| JP | 2011-129147 | 6/2011 |
| JP | 2011-170709 | 9/2011 |
| KR | 10-2005-0100441 | 10/2005 |
| KR | 10-2006-0052924 | 5/2006 |
| KR | 10-1016579 | 2/2011 |
| KR | 10-2011-0044315 | 4/2011 |

OTHER PUBLICATIONS

European Office Action issued on Oct. 16, 2015, in counterpart European Application No. 13176648.7 (6 pages, in English).

* cited by examiner

FIG. 2

201 — _lp_int a;
202 — _mp_char b[10];
203 — _hp_void ISR0 (unsigned int uiISRNum){...}
204 — void decode(_gp_inputData, ...)
205 — _lp_ {...}

FIG. 3

```
                           Function
_lp_int SpinLock(uint*uiplock){
   _lp_int i;

while(1){
      if(uipLock == LOCKED){Loop
         for(i=0; i<SPIN_BACKOFF; i++);
         continue;                        ⎫
      }                                   ⎬ 301
      uipLock = LOCKED returnOK;
   }
}
```

_lp_int SpinLock;
....

```
SpinLock(uipLock0);
SpinLock(uipLock1);
....
SpinLock(uipLockN);
```
⎬ 302

APPARATUS AND METHOD FOR MANAGING POWER BASED ON DATA

CROSS-REFERENCE TO RELATED APPLICATIONS

This application claims the priority benefit of Korean Patent Application No. 10-2012-0077221, filed on Jul. 16, 2012, in the Korean Intellectual Property Office, the disclosure of which is incorporated herein by reference.

BACKGROUND

1. Field

One or more example embodiments relate to an apparatus and method for managing power for a mobile device, a multimedia device, and an embedded system based on data applicable to the field required for power management.

2. Description of the Related Art

Recently, consumer demand is on the increase for a high-speed central processing unit to run complex applications on a mobile device and the like.

With this demand, resource consumption of system hardware is increasing, and as a consequence, power consumption of a system is also increasing.

This increase in power consumption may reduce an available operating time of a mobile device since battery life and thus power capacity is limited.

A system-level low power design currently uses a dynamic power management (DPM) technique and a dynamic voltage scaling (DVS) technique.

The DPM technique operates an idle device in a power-down mode to reduce power consumption of an entire system while controlling power overhead incurred in operating the corresponding device in a wake-up mode.

The DVS technique controls an operating voltage of a processor within a range of a time limit condition satisfied by a voltage scheduler for the purpose of minimizing energy consumption. In a case in which an energy gain obtainable by reducing voltage supplied to a peripheral device is absent, the DPM and DVS techniques may have a trade-off relationship. In particular, from a processor point-of-view, the DVS technique may decrease dynamic power consumption by lowering a processing rate of a processor. However, this may increase not only a period of use of a peripheral device, but also a static power consumption of the peripheral device. To reduce power consumption of the peripheral device, the DPM technique may operate the peripheral device in a power-down mode while reducing a time expended to activate a task.

SUMMARY

The foregoing and/or other aspects are achieved by providing an apparatus for managing power based on data, the apparatus including a code segment searching unit configured to search for at least one code segment in which a power type is inserted, a block determining unit configured to determine at least one block based on the at least one found code segment, and a power mode control unit configured to control the at least one determined block to operate in a power mode corresponding to the power type.

The power mode control unit may be configured to load at least one piece of data processed by the at least one determined block in a memory corresponding to the power type.

The power mode control unit may be configured to add at least one new code segment at a location associated with the at least one determined block to operate the at least one determined block in a power mode corresponding to the power type.

The power mode control unit may be configured to control a system clock using the at least one determined block to operate the at least one determined block in a power mode corresponding to the power type.

The at least one code segment may correspond to data described as a power type from a user. For example, the at least one code segment may include at least one piece of data of a variable, an array, a function, an argument, and a region.

The block determining unit may be configured to determine, to be a super block, blocks identified by the same power type and located within a predetermined distance among the at least one determined block.

The power mode control unit may be configured to control code segments located between a start and an end of the super block to operate in the same power mode.

The block determining unit may be configured to verify whether a size of the at least one found code segment is greater than or equal to a predetermined threshold value, and to determine the at least one found code segment to be the at least one determined block when the size of the at least one found code segment is greater than or equal to the predetermined threshold value.

The power mode control unit may be configured to change from the power mode corresponding to the power type in which the at least one determined block is operated, to a previous power mode, when processing of the at least one determined block is terminated.

The power mode control unit may be configured to verify a number of power types per power type in the determined block, and to control the determined block to operate in a power mode corresponding to a power type of a greatest number among the verified number of power types.

The power mode control unit may be configured to verify a data size of each power type in the determined block, and to control the determined block to operate in a power mode corresponding to a power type of a largest data size among the verified data sizes.

The apparatus may further include a workload analyzing unit configured to analyze a workload of the at least one determined block.

The power mode control unit may be configured to control the at least one determined block by changing the power mode based on the analyzed workload.

The foregoing and/or other aspects are achieved by providing a method for managing power based on data, the method including searching, by a code segment searching unit, for at least one code segment in which a power type is inserted, determining, by a block determining unit, at least one block based on the at least one found code segment, and controlling, by a power mode control unit, the at least one determined block to operate in a power mode corresponding to the power type, and the at least one code segment may correspond to data described as a power type from a user.

The controlling, by the power mode control unit, the at least one determined block to operate in the power mode corresponding to the power type may include loading at least one data processed by the at least one determined block in a memory corresponding to the power type.

The controlling, by the power mode control unit, the at least one determined block to operate in the power mode corresponding to the power type may include adding at least one new code segment at a location associated with the at least one determined block to operate the at least one determined block in the power mode corresponding to the power type.

The controlling, by the power mode control unit, the at least one determined block to operate in the power mode corresponding to the power type may include controlling a system clock using the at least one determined block to operate the at least one determined block in the power mode corresponding to the power type.

The method may further include analyzing, by a workload analyzing unit, a workload of the at least one determined block, and the controlling, by the power mode control unit, the at least one determined block to operate in the power mode corresponding to the power type may include controlling the at least one determined block by changing the power mode based on the analyzed workload.

The foregoing and/or other aspects are achieved by providing a method for managing power. The method includes determining a power mode for a block of code based on a power type that has been inserted into the block of code, and controlling, by a processor, a power for the block of code based on the determined power mode.

The foregoing and/or other aspects are achieved by providing a method for managing power in a device. The method includes inserting code comprising a power type into a block of code, determining a power mode for the block of code based on the inserted power type, and controlling, by a processor, a power for the block of data based on the determined power mode.

The foregoing and/or other aspects are achieved by providing an apparatus managing power in a device. The apparatus includes a plurality of memories, each memory having a different power consumption, a code segment searching unit configured to search code of the device for at least one code segment in which a power type has been inserted, a block determining unit configured to determine a block of code comprising the code segment in which the power type has been inserted, and a power mode control unit configured to determine a power mode for the block of code based on the power type and to selectively load at least one piece of data into a memory among the plurality of memories based on the determined power mode.

The foregoing and/or other aspects are achieved by providing an apparatus managing power in a device. The apparatus includes a processor to control one or more processor-executable units, a code segment searching unit configured to search code of the device for at least one code segment into which a power type has been inserted, a block determining unit configured to determine a block of code comprising the at least one code segment into which the power type has been inserted, and a power mode control unit configured to verify a quantity of power types in the determined block of code and to control the determined block of code to operate in a power mode corresponding to a power type having a greatest quantity among the verified quantity of power types.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 2 illustrates an example of setting a power type to data;

FIG. 3 illustrates an example of determining a block based on a power type;

FIG. 7 illustrates an example of a method for managing power based on data in which a block determining operation is compensated for;

DETAILED DESCRIPTION

Figure 1:
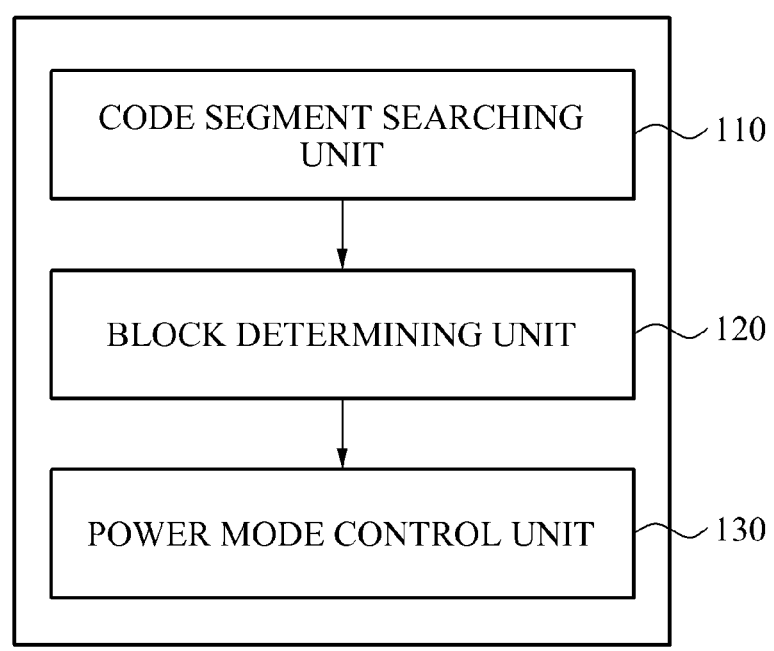
FIG. 1 illustrates an example of an apparatus for managing power based on data.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an example of an apparatus 100 for managing power based on data.

The apparatus 100 for managing power based on data according to an embodiment may manage power of a device using a power type within the device.

For example, the apparatus 100 may manage power by controlling a system clock using a power type.

That is, the apparatus 100 may define a power type corresponding to a power mode, for example, a low power, a middle power, a high power, or a general power, and may search the entire code for a code segment in which the defined power type is inserted.

At least one code segment may be interpreted as at least one piece of data of a variable, an array, a function, an argument, and a region, defined in the entire code.

The apparatus 100 may define an area of code associated with the found code segment to be a block, and may control the block to operate in a corresponding power mode.

The apparatus 100 may control power by verifying a workload of the corresponding block, by calculating a weight value based on the verified workload, and by changing a clock based on the calculated weight value.

Accordingly, the apparatus 100 for managing power based on data according to an embodiment may implement a low power system through power management.

The apparatus 100 for managing power based on data according to an embodiment may automate determination and management of a power management region with minimum effort on the part of a programmer so that the power management region may be fine-grained and invulnerable to a programming error.

Accordingly, the apparatus 100 may include, for example, a code segment searching unit 110, a block determining unit 120, and a power mode control unit 130.

The code segment searching unit 110 may search for or detect at least one code segment in which a power type is inserted, from the entire code.

FIG. 2 illustrates an example of setting a power type for data such as for a block.

As shown in FIG. 2, a power type may be pre-defined in an area corresponding to data among the entire code.

That is, a power mode may be defined to operate a variable 'a' in a low power mode by inserting '_lp_' in the variable 'a' distinguished by an integer, as shown in a dotted line box corresponding to reference numeral 201.

As shown in a dotted-line box corresponding to reference numeral 202, a power mode may be defined to operate an array b[10] in a middle power mode by inserting '_mp_' in the array b[10] distinguished by a character.

As shown in a dotted-line box corresponding to reference numeral 203, a power mode may be defined to operate a function 'ISR0' in a high power mode by inserting '_hp_' in the function 'ISR0'.

As shown in a dotted-line box corresponding to reference numeral 204, a power mode may be defined to operate a function 'decode' in a general power mode by inserting '_gp_' in an argument 'inputData' of the function 'decode'.

As shown in a dotted-line box corresponding to reference numeral 205, a power mode may be defined to operate a predetermined region in a low power mode by inserting '_lp_' in the region.

Conventionally, a code is regarded as an essential component for power management. That is, a portion of code is set to be a low power region and is managed.

Conversely, the apparatus 100 for managing power based on data according to an example may regard data, rather than a code, as a core for power management. That is, the apparatus 100 may set a power mode to data by inserting a power type, and may operate an arithmetic unit to operate in the power mode corresponding to the power type inserted during processing of the data.

Accordingly, an area using the corresponding data may be searched for and regarded as a power management region, and may be managed.

A method for setting a power mode for data processing may be implemented by adopting a new data type or by inserting a power type in an existing data type.

In FIG. 2, a power type, '_lp_', '_mp_', '_hp_', and '_gp_', respectively indicating a low power, a middle power, a high power, and a general power, may be inserted into an existing data type.

A description of the power mode may include a memory, a function code, a code segment, hardware accelerator (HWA) instructions, intrinsics, and an argument, and may vary depending on a power type.

Hereinafter, data in which the power type has been inserted, is defined as power data.

The power type may be interpreted as a type of a power mode. That is, the power type may correspond to a power mode in a one to one relationship.

Referring to FIG. 1, the code segment searching unit 110 may search for or detect at least one code segment, in which a power type, for example, '_lp_', '_mp_', '_hp_', and '_gp_' has been inserted, among the entire code.

The block determining unit 120 may determine at least one block based on the at least one detected or found code segment.

The block determining unit 120 may verify whether a size of the at least one found code segment is greater than or equal to a predetermined threshold value, and when the size of the at least one found code segment is greater than or equal to the predetermined threshold value, may determine the at least one found code segment to be the at least one block.

That is, when the block is excessively small, the block determining unit 120 may fail to determine the corresponding area as a block since a gain obtainable through low power implementation by changing the power mode is judged to be insignificant when the block is smaller than the predetermined threshold value.

The code segment and the at least one block is described in detail with reference to FIG. 3.

FIG. 3 illustrates an example of determining a block based on a power type.

In FIG. 3, a block may be determined based on data in which a power type is inserted, that is, power data.

An instruction using power data may be determined to be a block.

The apparatus 100 for managing power based on data according to an example may determine a loop, a control block, and a function using data, to be at least one block.

In FIG. 3, when 'i' defined as a low power integer '_lp_int' in a function 'SpinLock' satisfies a predetermined condition 'uipLock==LOCKED', a 'for' loop may be interpreted as a code segment, and a repetitive 'while' statement for operating the 'for' loop may be determined to be a block.

Also, the apparatus 100 may determine the function 'SpinLock' to be a block.

Furthermore, the apparatus 100 may determine an assembly of blocks to be a block, and may define such a block to be a super block.

That is, the block determining unit 120 may determine, to be a super block, blocks located within a predetermined distance and identified by the same power type among the at least one determined block.

When different blocks spaced away at an excessively long distance in the entire code are determined to be in the same super block, it may be difficult to implement a low power system.

Accordingly, the block determining unit 120 may only determine blocks located within a predetermined distance to be a super block in the entire code among the determined blocks.

In FIG. 3, when the function 'SpinLock' including a power mode is continuous, the functions may be determined to be a super block 302 to achieve integrated power management.

The power mode control unit 130 may control code segments located between a start and an end of the super block to operate in the same power mode.

Accordingly, in an embodiment, the power mode control unit 130 may control code segments that are located between blocks constituting a super block and that operate in a different power mode from the super block, to operate in the same power mode as the super block, so as to prevent frequent changes of the power mode and enable integrated power mode.

Accordingly, the apparatus 100 for managing power based on data according to an example may reduce unnecessary power management costs due to implementation of various types of superblocks.

Referring to FIG. 1, the power mode control unit 130 may control the at least one determined block to operate in a power mode corresponding to the power type.

The power mode control unit 130 may load at least one piece of data processed by the at least one determined block in a memory corresponding to the power type.

The system may include a plurality of memories, each having a difference in power consumption.

For example, a low power memory may include a random access memory (RAM) using a flip-flop memory cell, in particular, static RAM (SRAM) that holds data in a static form as long as power is supplied.

A high power memory may include a dynamic RAM (DRAM) that is used as a high-capacity short-term memory due to its simple structure and easy integration. A DRAM needs periodic refreshing since the stored information fades over time.

The power mode control unit 130 may load at least one piece of data in a corresponding memory among a plurality of memories of different power consumption, based on the power type.

The power mode control unit 130 may add at least one new code segment at a location associated with the at least one determined block to operate the at least one determined block in a power mode corresponding to the power type.

For example, the power mode control unit 130 may control the at least one determined block to operate in a power mode corresponding to the power type by inserting a prolog code in front of a start of the at least one determined block and inserting an epilog code after an end of the at least one determined block.

The power mode control unit 130 may control a system clock using the at least one determined block to operate the at least one determined block in a power mode corresponding to the power type.

A plurality of memories of different power consumption may be present, and in association with these memories, a central processing unit (CPU), a direct memory access (DMA) unit, and an HWA may be operated.

These units may be operated as a system clock, and the power mode control unit 130 may control the system clock using the at least one determined block to operate the at least one determined block in a power mode corresponding to the power type.

When processing of the at least one determined block is terminated, the power mode control unit 130 may change from the power mode corresponding to the power type, to a previous power mode.

After the power mode control unit 130 controls the block in a predetermined power mode, the power mode control unit 130 may change from the predetermined power mode at which the block is operated, to a previous power mode.

The power mode control unit 130 may verify a number or quantity of each different kind of power type present in the determined block, and may control the determined block to operate in a power mode corresponding to a power type having a greatest quantity among the verified number of different kinds of power types.

That is, when a plurality of power types are present in one block, the power mode control unit 130 may control the corresponding block to operate in a power mode corresponding to a power type having a greatest quantity in the block, so as to prevent excess power consumption caused by frequent changes of the power mode.

The power mode control unit 130 may verify a data size of each power type in the determined block, and may control the determined block to operate in a power mode corresponding to a power type of a largest data size among the verified data sizes.

That is, when a plurality of power types are present in one block, the power mode control unit 130 may control the corresponding block to operate in a power mode corresponding to data defined with a largest size, so as to prevent excess power consumption caused by frequent changes of the power mode.

As an example, when data 'i' defined in the form of an integer represents a low power mode and data 'a' defined in the form of an array represents a high power mode, it may be generally judged that data of an integer has a larger size than data of an array.

That is, the power mode control unit 130 may control the corresponding block to operate in a high power mode.

Figure 4:
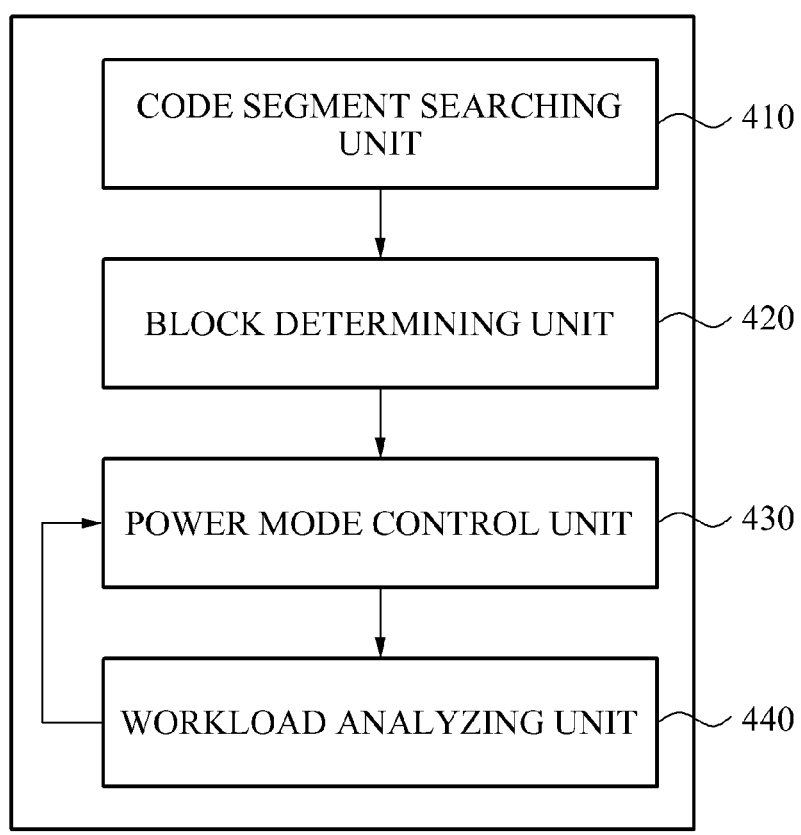
FIG. 4 illustrates another example of an apparatus for managing power based on data.

FIG. 4 illustrates another example of an apparatus 400 for managing power based on data.

The apparatus 400 for managing power based on data according to another example may further determine a power mode of a block based on a workload of the block. Accordingly, the apparatus 400 may enable precise power management.

Referring to FIG. 4, the apparatus 400 may include, for example, a code segment searching unit 410, a block determining unit 420, a power mode control unit 430, and a workload analyzing unit 440.

The code segment searching unit 410 may search among the entire code for at least one code segment in which a power type has been inserted.

The block determining unit 420 may determine at least one block based on the at least one found code segment.

The block determining unit 420 may verify whether a size of the at least one found code segment is greater than or equal to a predetermined threshold value, and when the size of the at least one found code segment is greater than or equal to the predetermined threshold value, may determine the at least one found code segment to be the at least one block. That is, the block determining unit 420 may determine the at least one found code segment as a block if the size of the code segment is greater than or equal to a predetermined threshold value.

That is, when the block is excessively small, the block determining unit 420 may fail to determine the corresponding area to be a block since a gain obtainable through low power implementation by changing the power mode is judged to be insignificant. That is, if the power mode is changed too frequently due to the predetermined threshold value being set too low and thereby determining too many small found code segments as blocks, sufficient power savings will not be achieved.

The power mode control unit 430 may control the at least one determined block to operate in a power mode corresponding to the power type.

The power mode control unit 430 may load at least one piece of data processed by the at least one determined block in a memory corresponding to the power type.

The power mode control unit 430 may load at least one piece of data in a corresponding memory among a plurality of memories, each having different power consumption, based on the power type.

The power mode control unit 430 may add at least one new code segment at a location associated with the at least one determined block to operate the at least one determined block in a power mode corresponding to the power type associated with the at least one determined block.

For example, the power mode control unit 430 may control the at least one determined block to operate in a power mode corresponding to the power type by inserting a prolog code in front of a start of the at least one determined block and inserting an epilog code after an end of the at least one determined block.

The power mode control unit 430 may control a system clock using the at least one determined block to operate the at least one determined block in a power mode corresponding to the power type.

These arithmetic units may be operated as a system clock, and the power mode control unit 430 may control the system clock using the at least one determined block to operate the at least one determined block in a power mode corresponding to the power type.

When processing of the at least one determined block is terminated, the power mode control unit 430 may change from the power mode corresponding to the power type, to a previous power mode.

The power mode control unit 430 may verify a quantity of power types in the determined block, and may control the determined block to operate in a power mode corresponding to a power type having a greatest quantity among the verified quantity of power types.

The power mode control unit 430 may verify a data size of each power type in the determined block, and may control the determined block to operate in a power mode corresponding to a power type of a largest data size among the verified data sizes.

That is, when a plurality of power types are present in one block, the power mode control unit 430 may control the corresponding block to operate in a power mode corresponding to data defined with a largest size, so as to prevent excess power caused by frequent changes of the power mode.

The workload analyzing unit 440 may analyze a workload of the at least one determined block.

For example, the workload analyzing unit 440 may verify a power type of the determined block, and may verify a current workload of the determined block.

The workload analyzing unit 440 may control processing of the at least one determined block by changing the power mode based on the analyzed workload.

That is, the workload analyzing unit 440 may verify a power mode by verifying a power type of the determined block, and may verify a current workload of the determined block.

The workload analyzing unit 440 may calculate a weight value through the verified workload, and may calculate a change in system clock by applying the calculated weight value to the power mode.

Also, the workload analyzing unit 440 may change the system clock through a clock generator based on the calculated change in the system clock.

Accordingly, the system 400 may be implemented as a low power system by controlling power consumption of components in the terminal, for example, a CPU and the like.

Figure 5:
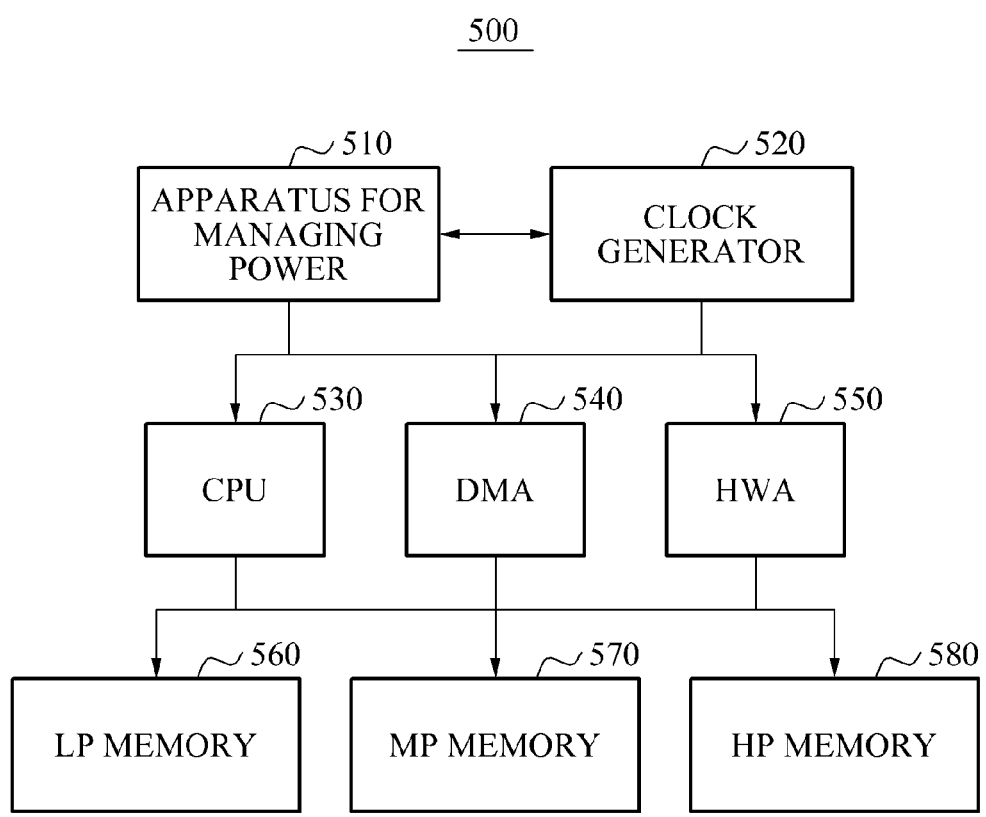
FIG. 5 illustrates an example of a system including an apparatus for managing power based on data.

FIG. 5 illustrates an example of a system 500 including the apparatus for managing power based on data.

The system 500 according to an example may include, for example, an apparatus 510 for managing power, a clock generator 520, a CPU 530, a DMA unit 540, an HWA 550, a low power (LP) memory 560, a middle power (MP) memory 570, and a high power (HP) memory 580.

A plurality of memories of different power consumption, for example, the LP memory 560, the MP memory 570, and the HP memory 580 may be present in the system 500.

An arithmetic unit, for example, the CPU 530, the DMA unit 540, and the HWA 550 may access one of the LP memory 560, the MP memory 570, and the HP memory 580 to download and upload data.

To perform these operations, the arithmetic unit, for example, the CPU 530, the DMA unit 540, and the HWA 550 may receive an input of a clock from the clock generator 520.

In this instance, the clock generator 520 may be managed through the apparatus 510 for managing power.

That is, the apparatus 510 for managing power may verify a power mode of a corresponding block based on a power type inserted in data.

Accordingly, the apparatus 510 for managing power may implement a low power system by controlling the clock generator 520 based on the verified power mode.

The LP memory 560, the MP memory 570, and the HP memory 580 may be interpreted as an SRAM, a nonvolatile RAM (NVRAM), and a DRAM, respectively, as an example.

Even the same DRAM may consume different amounts of power depending on a refresh rate. The apparatus 510 for managing power may manage a control element to control the memory and the arithmetic unit to perform different operations depending on a power mode.

Figure 6:
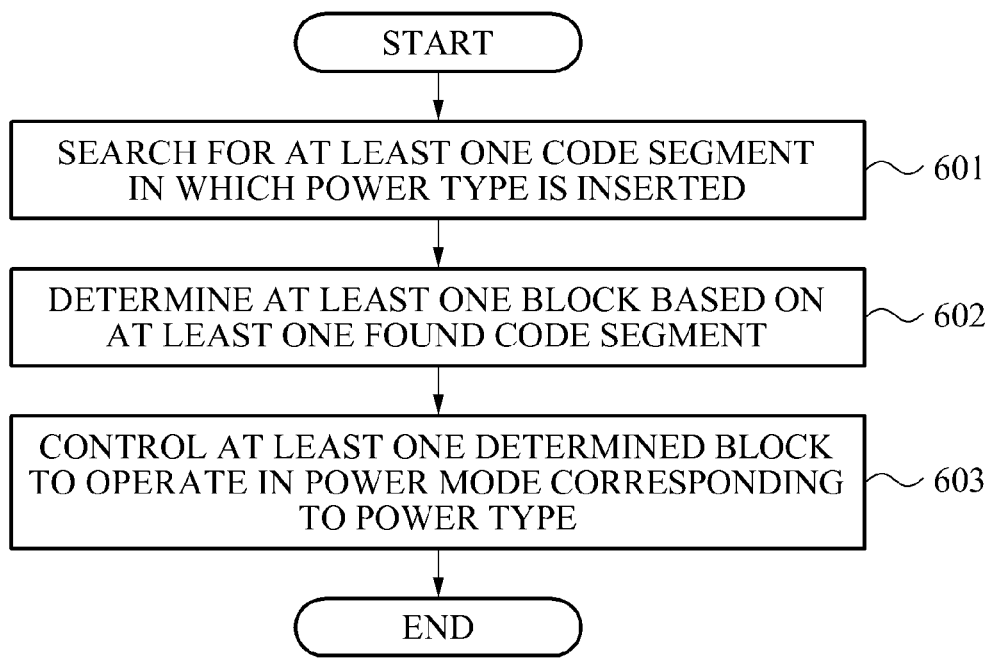
FIG. 6 illustrates an example of a method for managing power based on data.

FIG. 6 illustrates an example of a method for managing power based on data.

The method for managing power based on data according to an example may automate determination and management of a power management region with a minimum effort of a programmer and thus, the power management area may be fine-grained and invulnerable to a programming error.

Referring to FIG. 6, in operation 601, the method may search for at least one code segment in which a power type has been inserted.

For example, the at least one code segment may be interpreted as at least one piece of data of a variable, an array, a function, an argument, and a region.

In operation 602, the method may determine at least one block based on the at least one found code segment.

In operation 603, the method may control the at least one determined block to operate in a power mode corresponding to the power type.

Figure 7:
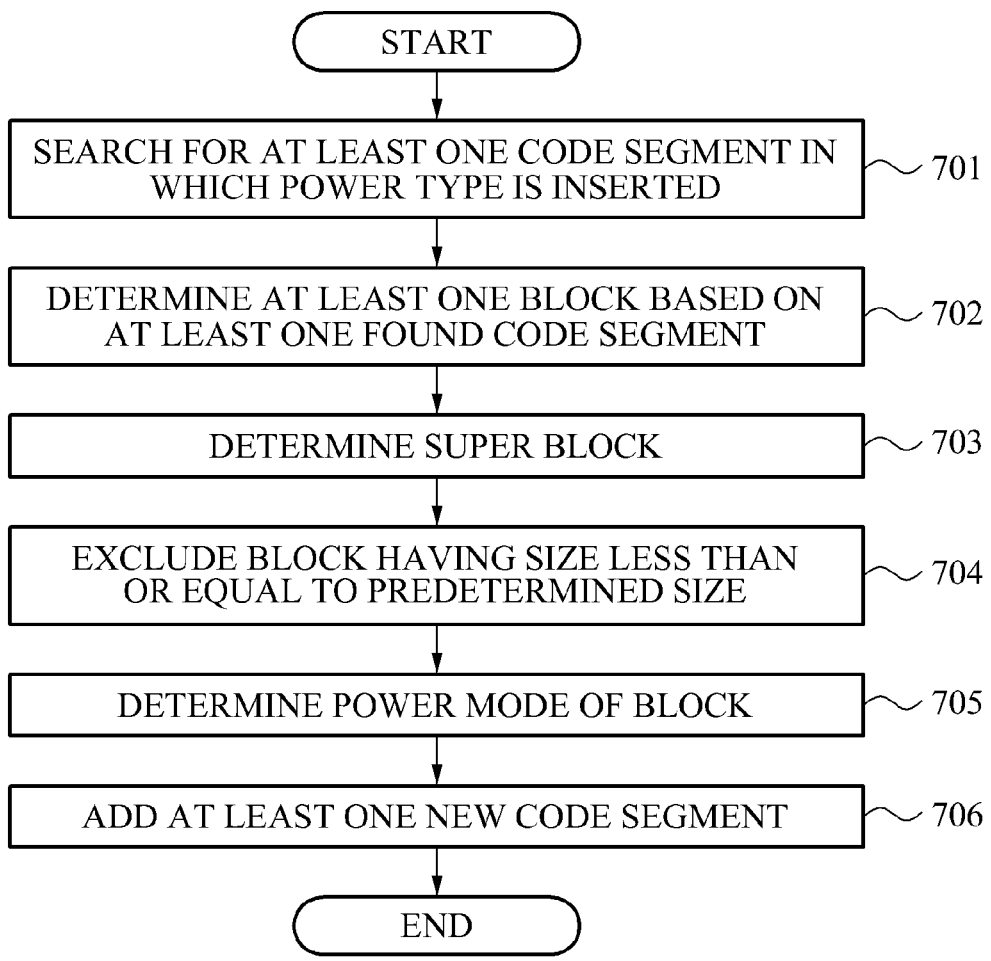

FIG. 7 illustrates an example of a method for managing power based on data in which a block determining operation is compensated for.

Referring to FIG. 7, in operation 701, the method may search for at least one code segment in which a power type has been inserted, among the entire code.

For example, a power mode may be defined to operate a variable 'a' in a low power mode by inserting '_lp_' in data of the variable 'a' distinguished by an integer.

Accordingly, the method may verify the power type inserted in the data of the variable 'a' among the entire code, and may search for at least one code segment in which the power type has been inserted.

In operation 702, the method may determine at least one block based on the at least one found code segment.

For example, the method may determine a loop, a control block, and a function using data, to be at least one block.

In operation 703, the method may determine a super block from the determined blocks when a plurality of blocks is determined.

The method may determine a super block by grouping neighboring blocks among the found blocks.

The super block may be interpreted as another block.

For example, when a super block is determined by grouping five blocks among ten initially found blocks, the method may recognize and process the determined super block and the remaining five blocks as one block. That is, the method may recognize and process the initially found ten blocks as six blocks by determining the super block and treating the super block as a single block.

In operation 704, the method may exclude a block having a size less than or equal to a predetermined size among the blocks including the super block.

The block may be determined during compiling of the entire code.

The method may search for an area using power data in which the power type is inserted among the entire code, and may determine the blocks.

Among the determined blocks, a super block may be determined, and in this instance, the method may verify whether the determined blocks satisfy a predetermined condition.

That is, a block having a small size may be excluded from an object for power management.

Accordingly, a power mode may be only set to the remaining blocks.

In operation 705, the method may determine the power mode of the blocks.

As an example, the method may verify a type of the power mode of the blocks, and may verify a number of blocks per the verified type.

The method may determine the power mode of the blocks to be a power mode of a type corresponding to a greatest quantity of blocks.

When a greatest quantity of blocks operating in a low power mode is present among the blocks, the method may determine the power mode of the blocks to be a low power mode. That is, in an embodiment, if a super block is comprised of ten blocks, five of which are determined to operate in a low power mode, three of which operate in a middle power mode, and two of which operate in a general power power mode, the method may determine the power mode of all ten blocks of the super block to be a low power mode.

As another example, the method may verify sizes of the blocks, and may determine the power mode of the blocks to be a power mode of a block having a largest size.

In operation 706, the method may add at least one new code segment to operate the blocks in the determined power mode.

The method may insert a code for setting a power mode in front of or after a corresponding block for each block.

That is, the method may add at least one new code segment at a location associated with the at least one determined block to operate the at least one determined block in a power mode corresponding to the power type.

In this instance, the method may control the super block to operate in the determined power mode by inserting a prolog code in front of a start of the super block and inserting an epilog code after an end of the super block.

Figure 8:
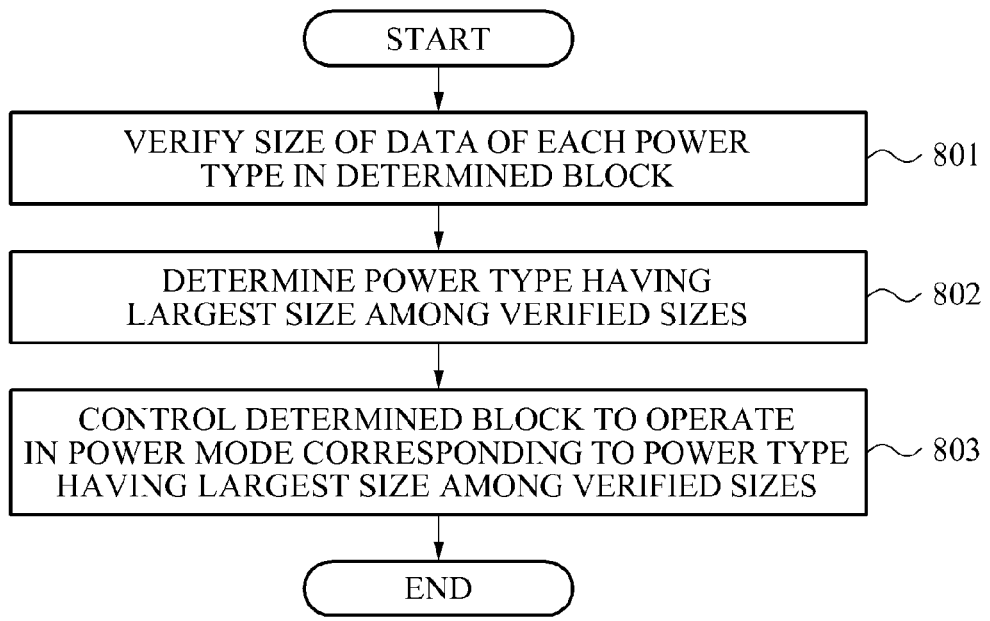
FIG. 8 illustrates an example of a method for controlling a determined block to operate in a related power mode.

FIG. 8 illustrates an example of a method for controlling a determined block to operate in a related power mode.

Referring to FIG. 8, in operation 801, the method may verify a size of data of each power type in the determined block.

A plurality of power types may be inserted in one block.

For example, a plurality of data, for example, '_lp_int' and '_hp_char a[10]' may be defined in a function 'Spin-Lock', and an independent power type may be inserted in each data. Accordingly, a plurality of power types may be included in the function 'SpinLock'.

The method may verify a size of data inserted in the power types within the function 'SpinLock'.

In operation 802, the method may determine a power type inserted in data having a largest size among the verified sizes.

In operation 803, the method may control the determined block to operate in a power mode corresponding to the determined power type.

Figure 9:
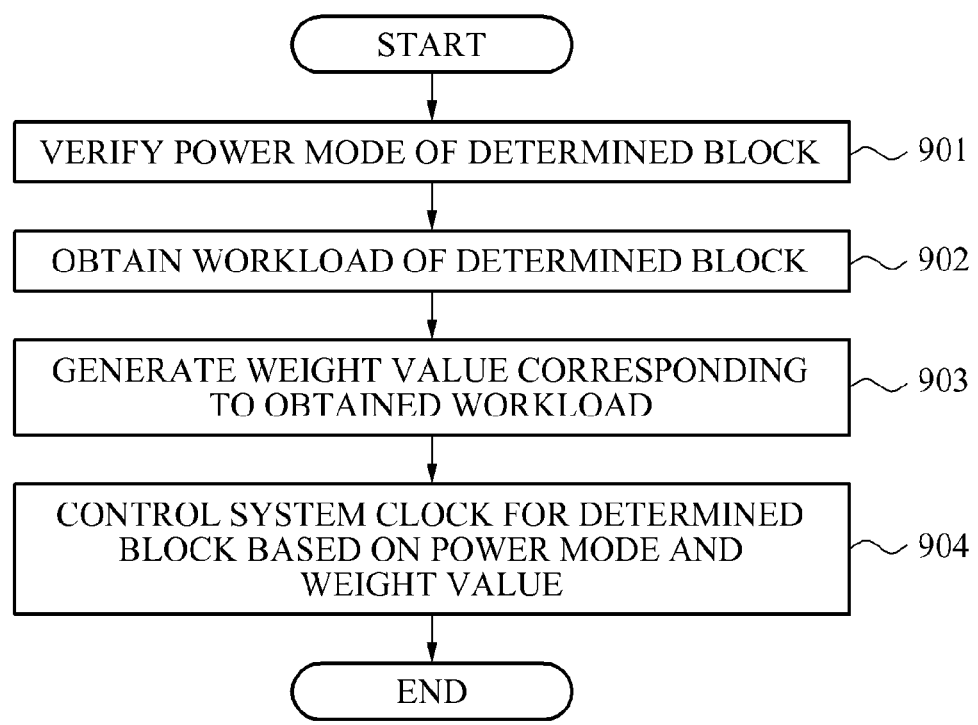
FIG. 9 illustrates an example of a method for controlling a power mode based on a workload.

FIG. 9 illustrates an example of a method for controlling a power mode based on a workload.

The method may analyze a workload of the at least one determined block, and may control the at least one determined block by changing the power mode based on the analyzed workload.

Referring to FIG. 9, in operation 901, the method may verify a power mode of the determined block.

The method may verify a number or quantity of each different kind of power type in the determined block, and may verify a power mode corresponding to a power type having a greatest quantity among the verified number of different kinds of power types.

That is, when a plurality of kinds of power types are present in one block, the method may control the corresponding block to operate in a power mode corresponding to a kind of power type having a greatest quantity, so as to prevent excess power consumption caused by frequent changes of the power mode.

The method may alternatively control the corresponding block to operate in a power mode corresponding to data defined with a largest size, so as to prevent excess power caused by frequent changes of the power mode.

In operation 902, the method may obtain a workload of the determined block.

The workload may correspond to an amount of work assigned to the determined block.

In operation 903, the method may generate a weight value corresponding to the obtained workload.

For example, to improve processing efficiency for a block having a high workload, a high weight value may be generated for a block having a low workload.

In operation 904, the method may control a system clock for controlling the determined block based on the power mode and the generated weight value.

The method may verify a workload of the determined block, may calculate a weight value based on the verified workload, and may change the system clock based on the calculated weight value, to control the power of the system effectively.

Figure 10:
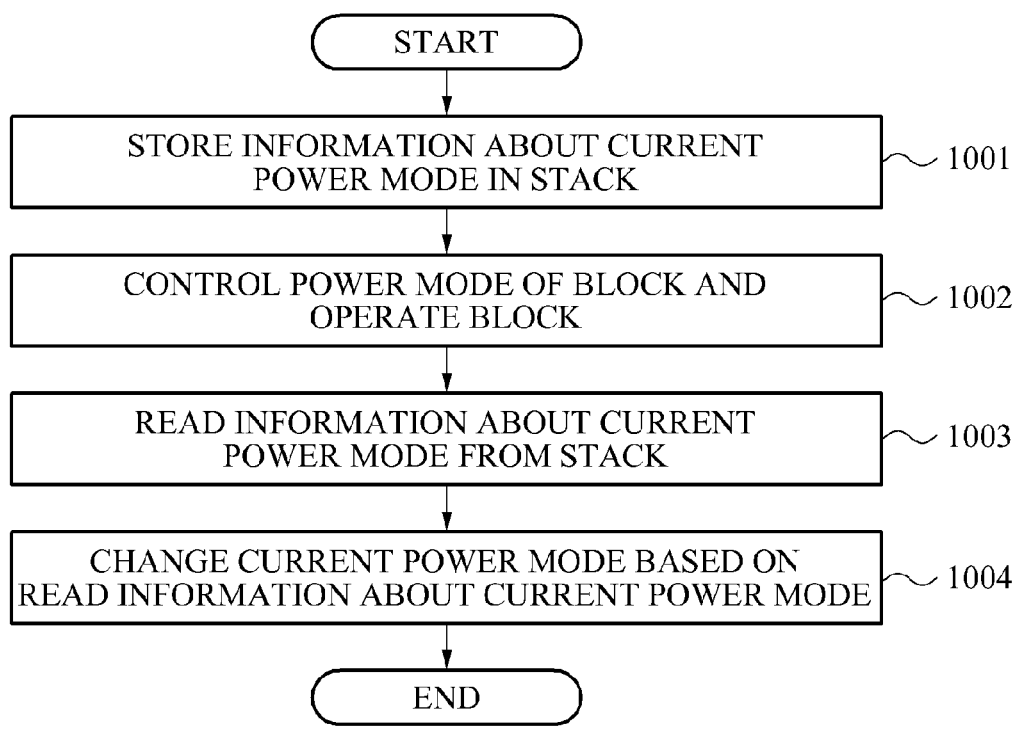
FIG. 10 illustrates an example of a method for changing a power mode.

FIG. 10 illustrates an example of a method for changing a power mode.

Referring to FIG. 10, in operation 1001, the method may store information about a current power mode in a stack.

For example, the power mode may be maintained in a stack type data structure.

Since the power mode may continue to change, a current power mode may be loaded in a stack by a last-in first-out (LIFO) method, or may be downloaded from the stack.

When changing the current power mode, the method may store the current power mode in a power mode stack and may set a power mode of a block to be a current power mode.

In operation 1002, the method may control the power mode of the determined block and may operate the block.

In operation 1003, when operation of the block is terminated, the method may read information about the current power mode stored in the stack.

When changing the current power mode, the method may store the current power mode in the power mode stack and may set the power mode of the block to be a current power mode.

The method may operate the corresponding block, and when the operation is terminated, may download a previous power mode from the stack and may then set the previous power mode to be a current power mode.

The method may manage tasks for the stack uploading and downloading the power mode, and may perform task management during context switching.

In operation 1004, the method may change the current power mode based on the read information about the current power mode.

Figure 11:
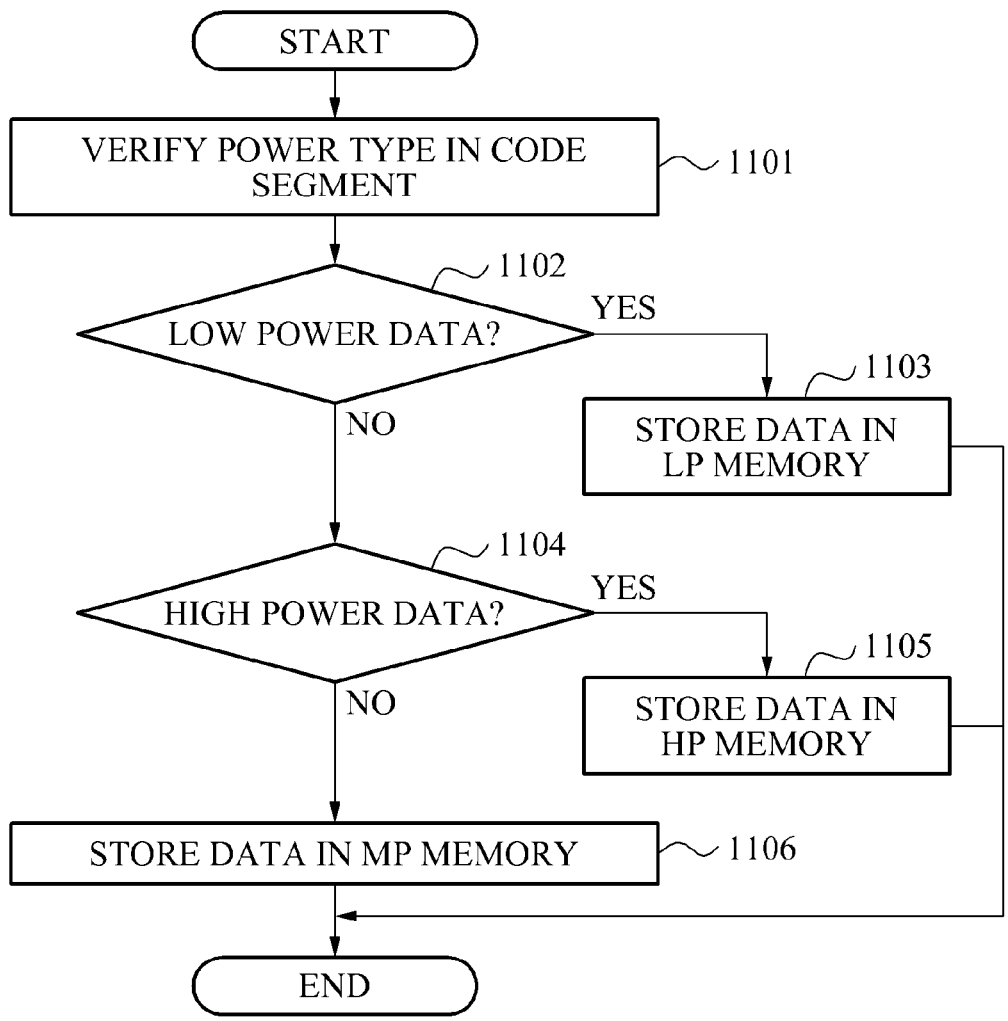
FIG. 11 illustrates an example of a method for laying out a memory based on a power mode.

FIG. 11 illustrates an example of a method for laying out a memory based on a power mode.

FIG. 11 illustrates a flowchart illustrating a process for placing power data including a power type in a memory.

In operation 1101, the method may verify a power type inserted in a code segment.

The method may store data in a corresponding memory based on the verified power type.

In operation 1102, the method may verify whether the data corresponds to low power data based on the verified power type.

In operation 1103, when the data corresponds to the low power data, the method may store the data in an LP memory.

In operation 1104, when the data fails to correspond to the low power mode, the method may verify whether the data corresponds to high power data.

In operation 1105, when the data corresponds to the high power data, the method may store the data in an HP memory.

In operation 1106, when the data fails to correspond to the low power data or the high power data, the method may store the data in an MP memory.

That is, a location of a memory in which the data is stored may be changed by a power mode determined based on a power type.

Figure 12:
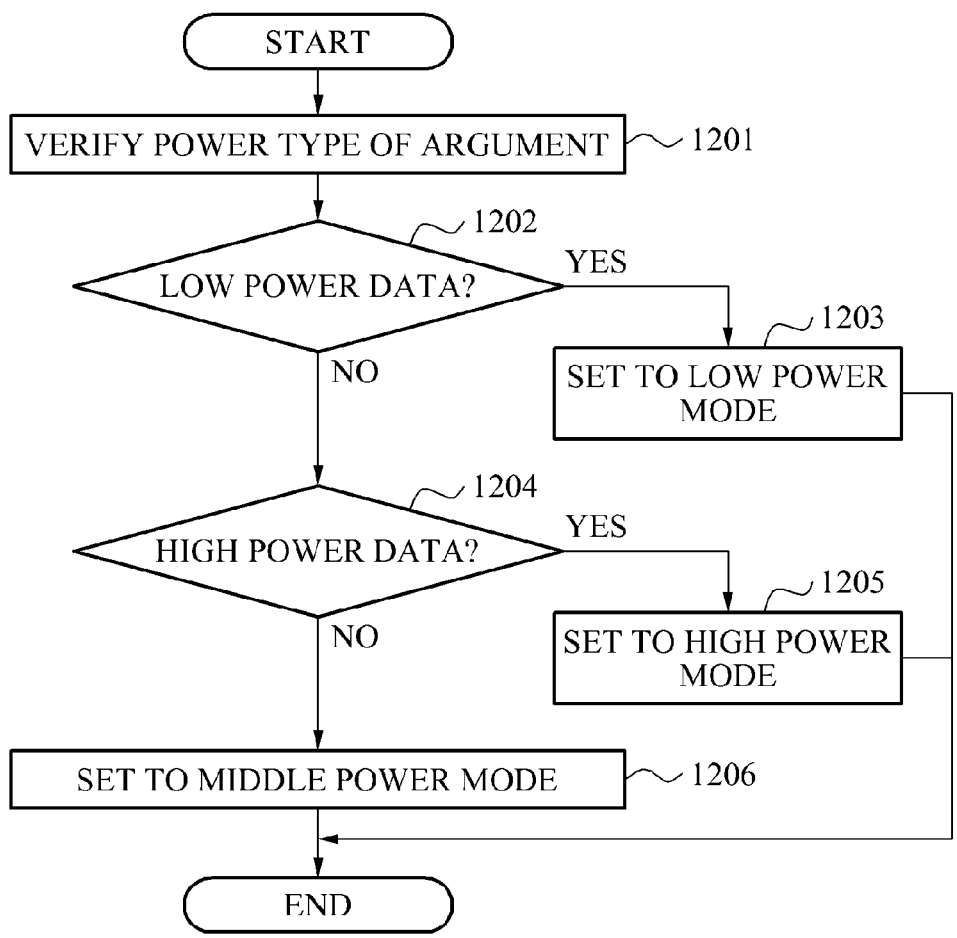
FIG. 12 illustrates an example of a method for managing power based on a power mode input.

FIG. 12 illustrates an example of a method for managing power based on a power mode input.

Referring to FIG. 12, in operation 1201, the method may verify a power type of an argument of data inserted in a code segment.

The method may set a data processing mode based on the power type of the verified argument.

Based on the verified argument, the power mode may be set during run-time rather than during compiling. That is, when a power type is used as an argument of a function, the method may manage power differently depending on an input value for the same code.

In operation 1202, the method may verify whether the argument of the data corresponds to low power data based on the verified power type.

In operation 1203, when the argument of the data corresponds to the low power data, the method may set the system to process the data in a low power mode.

In operation 1204, when the argument of the data fails to correspond to the low power data, the method may verify whether the argument of the data corresponds to high power data.

In operation 1205, when the argument of the data corresponds to the high power data, the method may set the system to process the data in a high power mode.

In operation 1206, when the argument of the data fails to correspond to the low power data or the high power data, the method may set the system to process the data in a middle power mode.

Accordingly, the method for managing power based on data according to an example may ease low power programming and enable dynamic power management to improve availability of a mobile device due to an increase in battery available time.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard discs, floppy discs, and magnetic tape; optical media such as CD ROM discs and DVDs; magneto-optical media such as optical discs; and hardware devices that are specially configured to store and perform program instructions, such as read-only memory (ROM), RAM, flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a controller such as a dedicated processor unique to that unit or by a processor common to one or more of the modules. The described methods may be executed on a general purpose computer or processor or may be executed on a particular machine such as the apparatuses described herein.

In the preceding disclosure, expressions such as "at least one of," when preceding a list of elements, may be interpreted as modifying or referring to the entire list of elements following the expression.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for managing power based on data, the apparatus comprising:
    a processor to control one or more processor-executable units;
    a code segment searching unit configured to detect at least one code segment in which a power type has been inserted;
    a block determining unit configured to determine at least one block based on the at least one detected code segment; and
    a power mode control unit configured to control the at least one determined block to operate in a power mode corresponding to the power type, the power type indicating one of at least three power consumption levels, and load at least one data processed by the at least one determined block in a memory, of a plurality of memories, responsive to the power type.

2. The apparatus of claim 1, wherein the plurality of memories each have a different power consumption.

3. The apparatus of claim 1, wherein the power mode control unit is configured to add at least one new code segment at a location associated with the at least one determined block to operate the at least one determined block in the power mode corresponding to the power type.

4. The apparatus of claim 1, wherein the power mode control unit is configured to control a system clock using the at least one determined block to operate the at least one determined block in a power mode corresponding to the power type.

5. The apparatus of claim 1, wherein the at least one code segment corresponds to data described as a power type from a user.

6. The apparatus of claim 1, wherein the block determining unit is configured to determine, as a super block, at least two blocks identified by the same power type and located within a predetermined distance.

7. The apparatus of claim 6, wherein the power mode control unit is configured to control code segments located between a start and an end of the super block to operate in a same power mode.

8. The apparatus of claim 1, wherein the block determining unit is configured to verify whether a size of the at least one found code segment is greater than or equal to a predetermined threshold value, and to determine the at least one detected code segment to be the at least one determined block when the size of the at least one detected code segment is greater than or equal to the predetermined threshold value.

9. The apparatus of claim 1, wherein the power mode control unit is configured to change from the power mode corresponding to the power type in which the at least one determined block is operated, to a previous power mode, when processing of the at least one determined block is terminated.

10. The apparatus of claim 1, wherein the power mode control unit is configured to verify a quantity of each different kind of power type in the determined block, and to control the determined block to operate in a power mode corresponding to a power type having a greatest quantity among the verified number of different kinds of power types.

11. The apparatus of claim 1, wherein the power mode control unit is configured to verify a data size of each power type in the determined block, and to control the determined block to operate in a power mode corresponding to a power type having a largest data size among the verified data sizes.

12. The apparatus of claim 1, further comprising:
a workload analyzing unit configured to analyze a workload of the at least one determined block.

13. The apparatus of claim 12, wherein the power mode control unit is configured to control the at least one determined block by changing the power mode based on the analyzed workload.

14. A method for managing power based on data, the method comprising:
detecting, by a processor, at least one code segment in which a power type has been inserted;
determining at least one block based on the at least one detected code segment; and
controlling the at least one determined block to operate in a power mode corresponding to the power type by loading at least one processed by the at least one determined block in a memory, of a plurality of memories, responsive to the power type, and the power type indicating one of at least three power consumption levels.

15. The method of claim 14, wherein the plurality of memories each have a different power consumption.

16. The method of claim 14, wherein the controlling of the at least one determined block to operate in the power mode corresponding to the power type comprises adding at least one new code segment at a location associated with the at least one determined block to operate the at least one determined block in the power mode corresponding to the power type.

17. The method of claim 14, wherein the controlling of the at least one determined block to operate in the power mode corresponding to the power type comprises controlling a system clock using the at least one determined block to operate the at least one determined block in the power mode corresponding to the power type.

18. The method of claim 14, further comprising:
analyzing a workload of the at least one determined block, wherein in the controlling, the at least one determined block to operate in the power mode corresponding to the power type comprises controlling the at least one determined block by changing the power mode based on the analyzed workload.

19. The method of claim 14, wherein the at least one code segment comprises at least one data of a variable, an array, a function, an argument, and a region.

20. A method of managing power, the method comprising:
determining a power mode for a block of code based on a power type that has been inserted into the block of code;
controlling, by a processor, a power for the block of code based on the determined power mode, and the power type indicating one of at least three power consumption levels; and
loading data, processed by the block of code, in one of a plurality of memories responsive to the power type.

* * * * *